N. HODGE.
Car Brake.
No. 6,762. Patented Oct. 2, 1849.
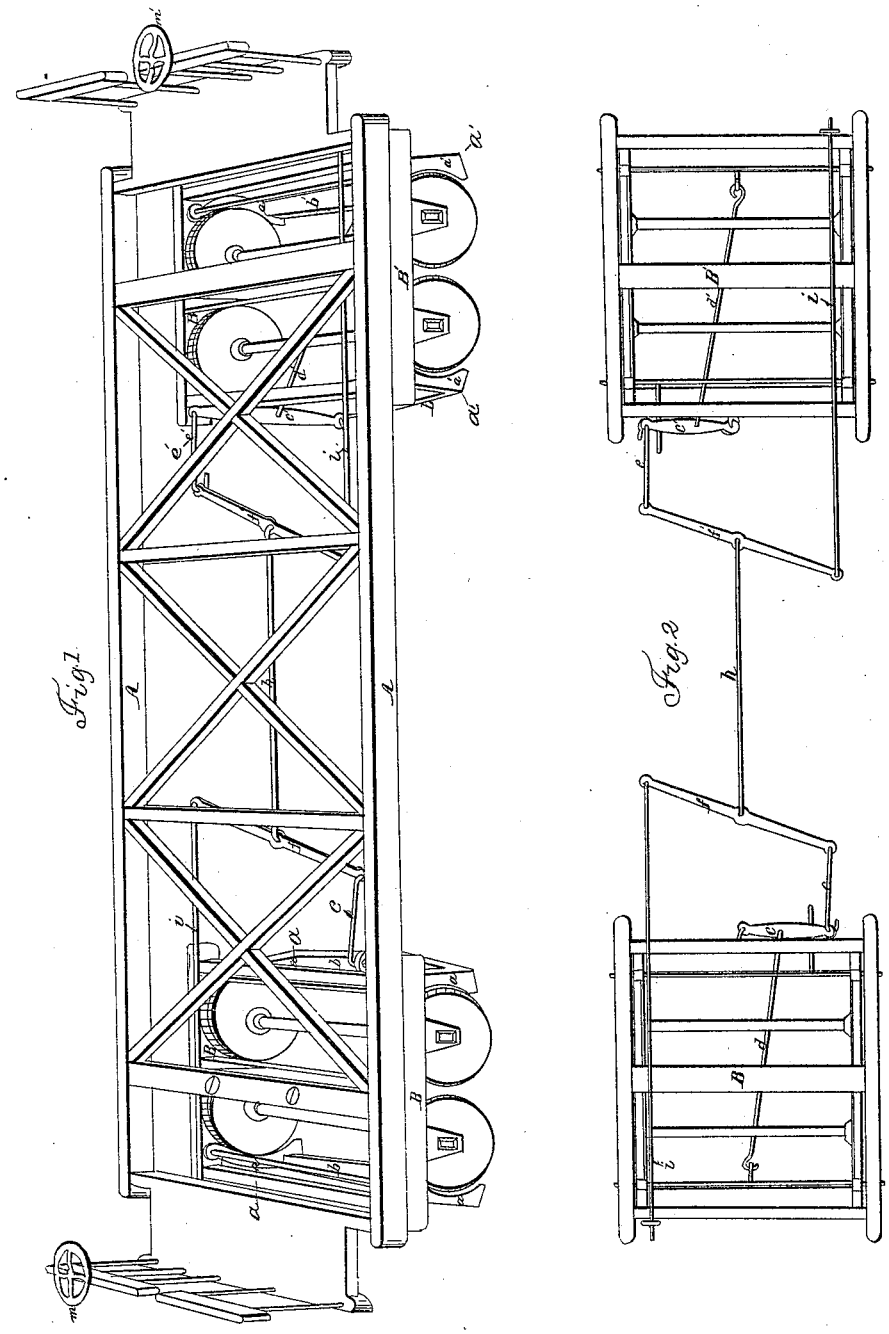

UNITED STATES PATENT OFFICE.

NEHEMIAH HODGE, OF NORTH ADAMS, MASSACHUSETTS.

MODE OF OPERATING BRAKES FOR CARS.

Specification forming part of Letters Patent No. 6,762, dated October 2, 1849; Reissued March 1, 1853, No. 231.

*To all whom it may concern:*

Be it known that I, NEHEMIAH HODGE, of Adams, in the county of Berkshire and State of Massachusetts, have invented a new and useful Improvement in Brakes for Railroad-Cars; and I do hereby declare that the following is a full, clear, and exact description of the same and of the characteristics which distinguish it from all others heretofore known, reference being had to the accompanying drawing, forming part of this specification, in which—

Figure 1 represents a perspective view of a double trucked car frame with my improved brake attached thereto, and Fig. 2 is a plan of the same.

My invention consists in so connecting the brakes of the two trucks of a car that the brakeman in operating upon either set shall bring both sets down upon their respective wheels at once, and cause each set to act with the same amount of force as it would if disconnected from the other; the arrangement of the several parts being such that it can be conveniently applied to the ordinary brakes in general use.

In the drawing A is the frame of a car supported on two four wheeled trucks B, B'; each wheel of the truck B has a brake $a$ hung from the extremity of the truck frame to act against its outer face. The brakes of each pair of wheels are connected by a cross bar $h$; a lever $c$ is hinged by one of its extremities to the middle of the inner cross bar of the truck and its fulcrum is connected by a link rod $d$ with the outer cross bar. The free extremity of this lever ($c$) is then connected by a second link bar $e$ extending toward the middle of the car frame with one extremity of a second lever $f$ extending across the frame. The rods and levers connecting the brakes of the two trucks are suspended by hangers to the under side of the car frame. The arrangement of brakes ($a'$) levers ($c'$ $f'$) and link bars ($d'$ $e'$) for the other truck B' is precisely the same as that for the truck B, and the fulcra of the equal and opposite transverse levers $f$ $f'$ are connected with each other by the rod $h$. The free ends of the transverse levers are connected with the brake wheels $m$ at the opposite ends of the car by the rods $i$. If now the brakeman operate upon the brake wheel $m$ to force the brakes of the truck B against their respective wheels, the whole of his force is exerted to draw the connecting rod $i$ toward the end of the car, and this acting through the lever $f$ brings down the opposite brakes ($a$ $a$) of the truck B upon their respective wheels. As the several levers of the second truck B' are precisely equal to their corresponding ones on the first truck B and as the rod $h$ being stationary forms the fulcrum of the second transverse lever $f'$ it is evident that the brakes of the second truck B' will be pressed against their respective wheels with the same force as those of the first. If the operation be reversed and the brakeman act upon the opposite brake wheel $m'$, then the rod $i$ being stationary becomes the stationary fulcrum of the series, and the power acting upon the brakes of the truck B' will be exerted in an equal manner upon those of the opposite truck B.

The peculiar advantages of this arrangement are first, that the force exerted on the several brakes is exactly equal throughout the whole system, and, second, the facility with which the common truck brakes can be altered by the addition of a few articles of trifling cost; thus trucks are usually furnished with the brakes $a$ the rod $d$ and the lever $c$ the last being at the outer extremity of the truck and connected directly with the brake wheel $m$; if now the trucks are turned end for end and transverse levers $f$ and rods $e$ $h$ $i$ are added the alteration is complete, and the same brakeman can exert double the force to stop the cars which he is able to do in the usual arrangement of single truck brakes.

I am aware that brake levers have been placed between the trucks of a car, and that a brake lever thus placed has been connected by its fulcrum with the brakes of one truck and by its working end with the brakes of the other so that the brakeman can bring both sets down upon the wheels at once, and cause each to act with the same force as if the other was not in operation. I do not therefore claim doing merely this, but when this has been done the levers have not been so arranged as to act with equal force upon the wheels of both trucks nor have they been conveniently arranged for application to such brakes as my arrangement is applied to.

What I claim therefore as my invention and desire to secure by Letters Patent is the peculiar manner herein described of arranging the levers and connecting rods, in combination with the brakes so as to apply both sets of brakes with equal force by working either brake-wheel.

In testimony whereof I have hereunto signed my name in presence of two witnesses.

NEHEMIAH HODGE.

Witnesses:
E. S. RENWICK,
P. H. WATSON.

[FIRST PRINTED 1913.]